Nov. 21, 1961
A. E. PHILLIPS
3,009,839
TANK SPRAYING METHOD
Original Filed Sept. 23, 1957
2 Sheets-Sheet 1
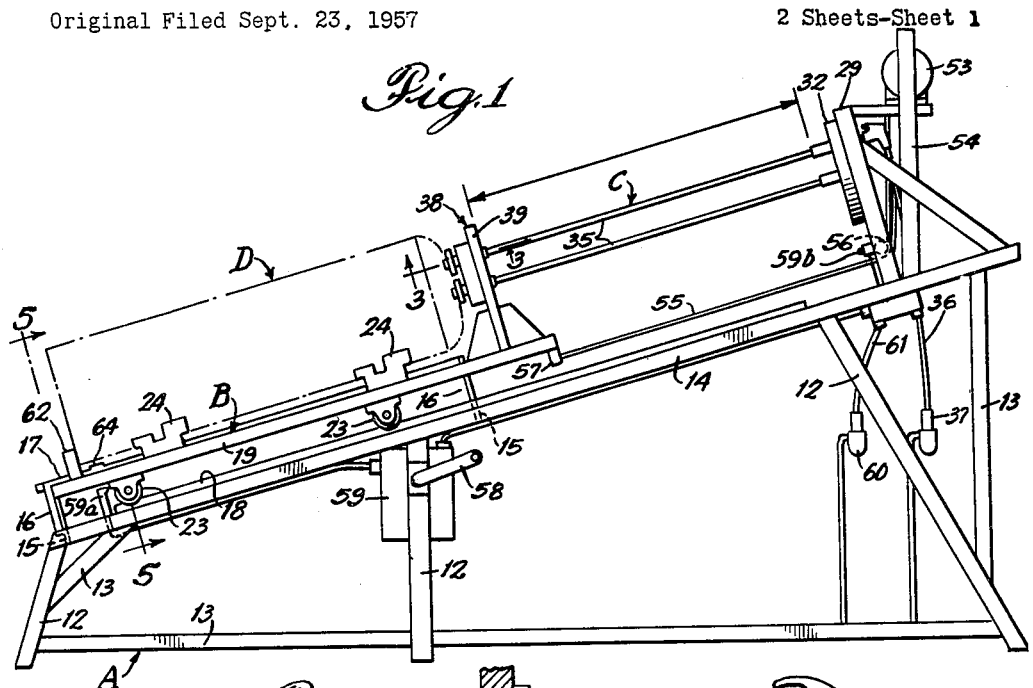
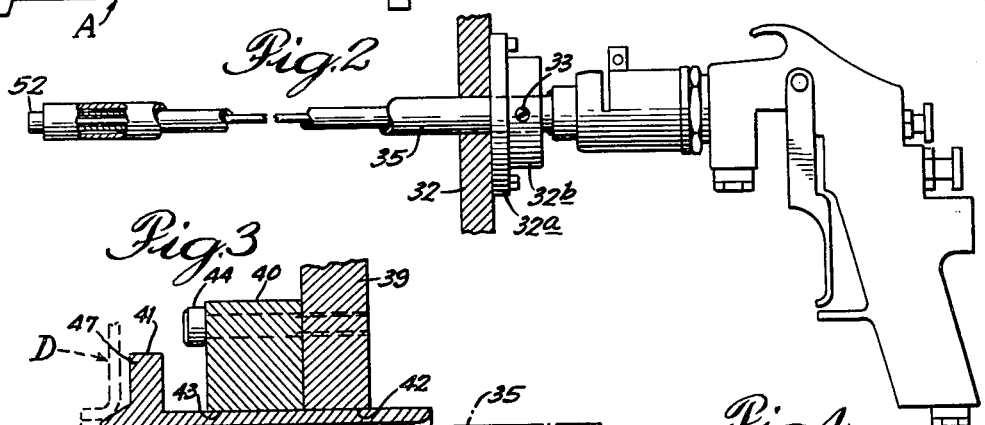
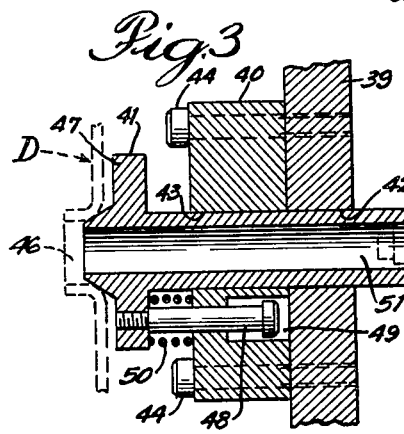
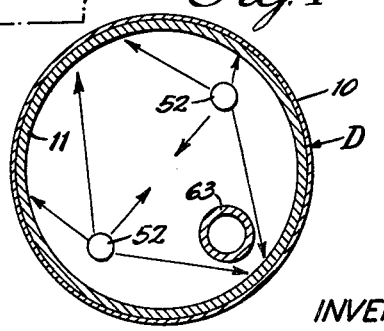
INVENTOR:
Arthur E. Phillips
BY Dawson, Tilton, Fallon & Lungmus
ATTORNEYS.

Nov. 21, 1961 A. E. PHILLIPS 3,009,839
TANK SPRAYING METHOD
Original Filed Sept. 23, 1957 2 Sheets-Sheet 2
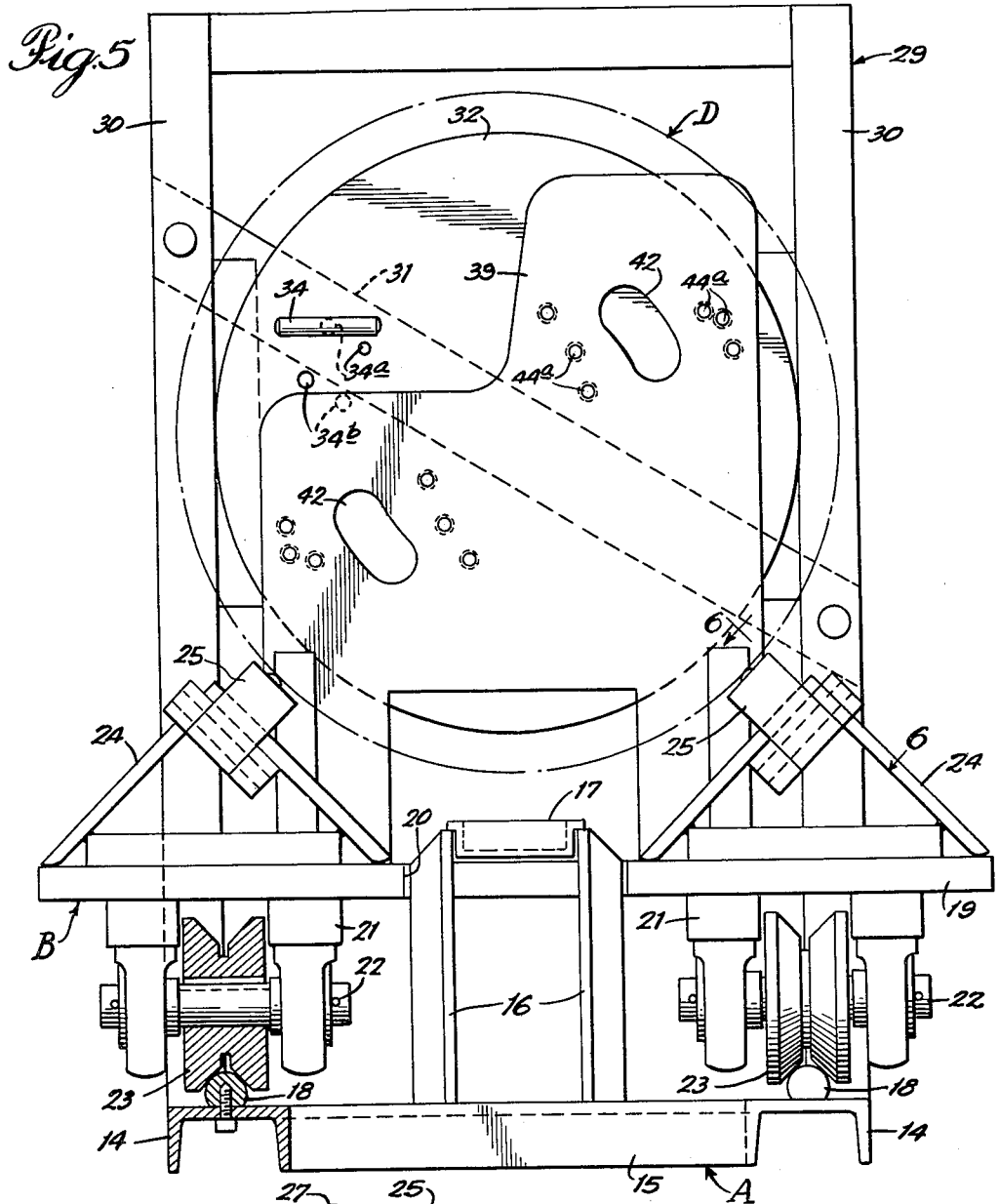
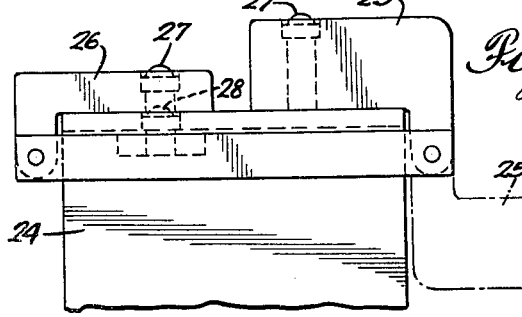
INVENTOR:
Arthur E. Phillips
BY
Lawson, Sillon, Fallon & Jungmus
ATTORNEYS.

United States Patent Office 3,009,839
Patented Nov. 21, 1961

---

3,009,839
TANK SPRAYING METHOD
Arthur E. Phillips, La Porte, Ind., assignor to The Coleman Company, Inc., Wichita, Kans., a corporation of Kansas
Original application Sept. 23, 1957, Ser. No. 685,737, now Patent No. 2,972,996, dated Feb. 28, 1961. Divided and this application Feb. 8, 1960, Ser. No. 7,372
7 Claims. (Cl. 134—23)

This invention is concerned with the manufacture of cement-lined tanks and relates specifically to a method for spraying and washing the inner cement linings of such tanks. The present application is a division of my copending application, Serial No. 685,737, filed September 23, 1957, now Patent No. 2,972,996.

As is well known, siliceous cements provide effective lining materials for metal tanks because of their strength, durability, chemical inactivity and relatively low cost. However, it has been found that during the use of such tanks for limited periods following installation, lime from the inner surface of the cement coating is released into a liquid, such as water, carried within the tank with the result that water drawn from the tank presents a cloudy appearance. One of the principal objects of the present invention is to provide a method for quickly and thoroughly washing the linings of such tanks so that excess lime will not be deposited into the water or other liquid stored within the tanks after installation.

Another object is to provide a method for removing excess lime from the tank lining after the cement lining has been applied but before it has been cured. In this connection, it is a specific object to provide a method wherein such lime may be flushed from the tank without washing away the aggregate component of the lining and without producing variations in the thickness of that lining after it has been sprayed. A further object is to provide a method wherein tanks of different size may be accommodated and wherein the spray nozzles may be precisely oriented with the spud openings of any given tank. Other objects will appear from the specification and drawings in which:

FIGURE 1 is a side elevation of a tank spraying apparatus adapted for use in connection with the present invention; FIGURE 2 is an enlarged broken side elevation of a spray device used in conjunction with the apparatus; FIGURE 3 is an enlarged broken sectional view taken along line 3—3 of FIGURE 1; FIGURE 4 is a cross-sectional view of a tank and illustrating the direction of fluid spray; FIGURE 5 is an enlarged end view of the apparatus shown partly in section and taken along line 5—5 of FIGURE 1; and FIGURE 6 is a still further enlarged view showing details of the carriage construction and taken along line 6—6 of FIGURE 5.

In the structure illustrated in the drawings, the letter A generally designates a frame, B represents a movable tank-supporting carriage, and C designates the spray unit supported by the frame. The broken lines in FIGURES 1, 3 and 5 represent a metal tank D removably supported by carriage B. As shown in FIGURE 4, tank D has an outer metal shell 10 and an inner cement lining 11. At the commencement of the spraying operation with which the present invention is concerned, the cement lining 11 has not fully dried or hardened. The cement material ordinarily consists of a mixture of sand, Portland cement and water, although it is to be understood that variations in the composition of the aggregate and hardening components may be made without departing from the present invention. Since spinning methods for applying cement tank linings are well-known in the art and since these methods are not directly involved in the present invention, a full disclosure of these methods is believed unnecessary herein.

Frame A is provided with a plurality of upstanding legs 12 and reinforcing beams 13 which combine to support a pair of parallel inclined frame members 14. The inclined frame members are held in uniformly spaced relation by transverse frame members 15 and, as illustrated most clearly in FIGURES 1 and 5, these transverse members are provided with upstanding drain trough supports 16 from which a longitudinally-extending inclined drain trough 17 is suspended. Each of the inclined frame members 14 has a cylindrical rail 18 secured to its upper surface and these parallel rails together provide a track for supporting and guiding the movement of tank carriage B.

The tank support or carriage B includes a platform 19 having a central longitudinal slot or opening 20 through which the drain 17 and drain supporting structure projects. Beneath the carriage are four sets of depending journal members 21 through which shafts 22 extend for rotatably supporting grooved wheels 23. Above the platform are mounted two pairs of tank supporting members 24, the members of each pair being disposed on opposite sides of the frame to form a seat for removably supporting a tank.

Preferably, each of the tank supporting members or units 24 is equipped with a pair of hinged seating members 25 and 26 having bearings 27 disposed at different elevations or radial distances from the longitudinal axis of a tank for supporting tanks of different size at substantially the same elevation. If the tank is of relatively small diameter, then hinged member 25 is disposed in the operative position illustrated in FIGURE 6 so that its bearing 27 will engage the periphery of that tank. If the tank is of larger diameter, then member 25 is pivoted into the position indicated by broken lines in the drawings so that the tank will seat upon the lower hinged seating member 26. Should adjustment to accommodate an even larger tank be required, member 26 may be flipped to the side to expose bearing 28 directly therebelow.

At the upper end of the inclined frame is the spray tube supporting structure 29 which includes a pair of upstanding side frame members 30 joined by a diagonal bar 31 upon which is mounted a rotatable turret 32. A pair of spray guns of the type commonly referred to as Binks guns extend through the apertured turret plate and are rotatably secured thereto by connecting plates 32a, 32b and set screws 33. The revolvable turret 32 may be locked in different selected positions by a lock pin 34 which is insertable through openings 34a and 34b in the diagonal bar and turret, respectively. Each gun is provided with an elongated tubular extension 35 which has a length substantially equal to that of the tanks to be sprayed and which is inclined downwardly in parallel alignment with inclined frame members 14 and carriage platform 19.

To maintain the spray tubes or extensions 35 in proper alignment I provide a guide assembly 38 which comprises an apertured upstanding plate 39 rigidly secured at its lower end to the front or upper portion of carriage platform 19, mounting blocks 40 and guide sleeves 41. Plate 39 is provided with a pair of arcuate openings 42 through which the spray gun tubes extend, the length of the openings permitting unrestricted rotation of the turret and guns within the desired range of adjustment. Each of the mounting blocks 40 has an opening 43 and is preferably equipped with a pair of setting pins 44 selectively insertable in plate openings 44a for locking the block and spray gun tube in any of a plurality of positions determined by the particular turret setting. The guide sleeves 41 extend through both the plate 39 and mounting blocks 40 and are provided with tapered or frusto-conical ends 45 adapted to seat within the spud openings 46 at the upper end of tank D. An integrally-formed flange 47 is provided adjacent the tapered end of each guide sleeve and a pin 48 is threadedly secured to each flange and projects rearwardly into an opening 49 in the mounting blocks. A compression spring 50 extends about pin 48 and is disposed between flange 47 and block 40 to urge the tapered guide sleeve rearwardly into sealing engagement with the spud opening of the tank. A bore 51 extends through each of the guide sleeves and has a diameter slightly greater than the outer diameter of tubular gun extension 35. Therefore, as the tank carriage B is moved upwardly along tracks 18, the nozzle 52 and tubular extension 35 of each spray gun will pass through the guide sleeves and into the tank supported by the carriage.

The carriage may be driven by any suitable power means such as a reversible electric motor 53 mounted upon the frame by support standard 54 and operatively connected to the carriage by a chain or cable 55. The chain is entrained about guide pulley 56 and is connected to the front end of the carriage at 57. Motor 53 is started by manually depressing handle 58 adjacent electrical control unit 59, and this unit, in conjunction with suitable limit switches 59a and 59b or other electrical control means automatically reverses the motor when the carriage has reached the upper limit of its path of travel and, in addition, synchronizes the operation of solenoid valves 37 and 60 with the operation of the motor. As the carriage moves upwardly from the position illustrated in FIGURE 1, both of the solenoid valves 37 and 60 are held open and water and air flow through conduits 36 and 61 respectively to the spray guns of the spray assembly C. However, when motor 53 is reversed and the tank-supporting carriage starts to descend along the inclined frame, solenoid valve 37 automatically closes so that only compressed air is discharged from the spray nozzles. Finally, when the carriage has again returned to its fully lowered position the control unit interrupts motor operation and the air-controlling solenoid valve 60 is automatically closed.

In the operation of the structure described, a cement-lined tank D is placed upon carriage B with its lower end resting against stop 62. The tank is then rotated upon the carriage until the tapered ends of guide sleeves or spud positioners 41 seat in the spud openings at the upper end of the cylindrical tank. The operator then depresses the control lever 58 and the carriage and tank travel upwardly at a predetermined speed along the inclined track. At the start of the upward travel, solenoid valves 37 and 60 are automatically actuated and allow both air and water to pass through the tubes 35 of the spray guns to spray the entire length of the cement-lined cavity. As indicated in FIGURE 4, the spray nozzles play a 360° circular spray pattern on the cement lining to wash away the lime coating with the tank and, in addition, direct a forward spray against the tank bottom and flue. As shown in FIGURE 5, the dual mounting of the spray gun insures an even distribution of atomized water and eliminates blind spots behind tank flue 63. At the completion of the upstroke, the direction of carriage travel is automatically reversed and the supply of water to the spray guns is interrupted. During the downward travel of the carriage and tank, the spray guns pass air only to clear vapor and liquid from the tank cavity that has accumulated during the atomizing cycle. Throughout the upward and downward travel of the tank, the lime material washed from the cement lining drains freely through the drain spud 64 of the tank and onto the drain trough 17 mounted upon the frame.

It has been found that when the slope of the carriage and tank is substantially 13° during the atomizing operation, the excess lime coating is thoroughly flushed from the tank without soaking the uncured lining and without materially affecting the thickness of that lining. However, it is to be understood that carriages and frames having different angles of inclination may be provided without departing from the principle of this invention.

While in the foregoing I have disclosed an embodiment of the present invention in considerable detail for purposes of illustration, it will be understood by those skilled in the art that many of these details may be varied considerably without departing from the spirit and scope of the invention.

I claim:

1. A method for flushing the cavity of a cement-lined tank to remove a lime coating thereon, comprising the steps of tilting the tank along its longitudinal axis, introducing an atomized spray of water at the upper end of said tank and passing said spray downwardly toward the lower end of the tank's cavity, discontinuing the flow of water when the spray reaches the lower end of the tank cavity, and draining said tank to remove lime-containing water therefrom.

2. In a method for flushing the cavity of a cement-lined tank to remove a lime coating therefrom, the steps comprising tilting the tank along its longitudinal axis, introducing at least one nozzle providing a radially-directed spray of water and air into the upper end of said cavity, moving said tank and nozzle relative to each other to pass said nozzle downwardly along the longitudinal axis of said tank, and draining said tank to remove lime-containing water therefrom.

3. In a method for flushing the cavity of a cement-lined tank to remove lime coating therefrom, the steps comprising supporting a tank with its longitudinal axis in inclined condition, introducing at least one nozzle providing an outwardly directed spray of water and air into the upper end of said cavity, moving said tank and nozzle relative to each other to pass said nozzle downwardly along the longitudinal axis of the tank, discontinuing the flow of water through said nozzle when the nozzle reaches the lower end of the tank cavity, and draining said tank to remove lime-containing water therefrom.

4. The method of claim 3 in which there is the further step of moving said tank and nozzle relative to each other to pass said nozzle upwardly from the lower end of the tank cavity to the upper end thereof, and introducing air into said cavity through said nozzle as said nozzle passes upwardly within said tank.

5. In a method for flushing the cavity of a cement-lined tank to remove a lime coating therefrom, the steps comprising tilting the tank along its longitudinal axis, introducing into the upper end of said cavity an outwardly directed atomized spray emanating from two spaced points on opposite sides of the tank's longitudinal axis, passing said spray downwardly toward the lower end of the tank's cavity along said longitudinal axis, and draining said tank to remove the liquid sprayed into said tank and the material flushed from the lining thereof.

6. The method of claim 5 in which said atomized spray comprises an air-water mixture.

7. The method of claim 6 in which there is the further steps of discontinuing the flow of water when the spray reaches the lower end of the tank cavity, and thereafter passing said spray upwardly toward the upper end of said tank cavity while said spray directs a stream of air against the walls of the tank.

References Cited in the file of this patent

UNITED STATES PATENTS

| | | |
|---|---|---|
| 1,629,486 | Dougherty | May 24, 1927 |
| 2,015,875 | Sloan | Oct. 1, 1935 |
| 2,668,550 | Burge | Feb. 9, 1954 |